Patented Nov. 1, 1949

2,486,540

UNITED STATES PATENT OFFICE 2,486,540

VITAMIN E PREPARATION

Kenneth C. D. Hickman and Leonard Weisler, Rochester, N. Y., assignors to Distillation Products, Inc., Rochester, N. Y., a corporation of Delaware No Drawing. Application December 4, 1945, Serial No. 632,815

9 Claims. (Cl. 260—333)

This invention relates to an improved method for preparing materials having vitamin E activity.

The use of vitamin E in medicinal fields is rapidly increasing but the amount of vitamin E available has remained practically constant, or is decreasing. There is a shortage of vitamin E at the present time and while vitamin E can be synthesized the synthetic product is exceedingly expensive.

This invention has for its object to provide an improved process for economically providing vitamin E active material. Another object is to provide a process whereby the total amount of vitamin E available for medicinal purposes is materially increased. Another object is to improve the state of the art. Other objects will appear hereinafter.

These and other objects are accomplished by our invention which includes the combination of steps comprising separating tocopherol contained in a soybean oil and converting this separated tocopherol into alpha tocopherol. Alpha tocopherol has a high degree of vitamin E activity as measured by the resorption sterility tests in rats, while gamma tocopherol is nearly inactive.

In the following examples and description we have given several of the preferred embodiments of our invention but it is to be understood that they are given by way of illustration and not in limitation thereof.

Examples of suitable methods for separating the tocopherol from soybean oil are high vacuum, unobstructed path distillation, selective adsorption, solvent extraction, and combinations thereof. In connection with the high vacuum distillation, it is preferred, but not necessary, for the oil to be first refined in order to remove lecithin. The lecithin removal step is well known in the art and does not form a part of our invention. Selective adsorption involves solution of the soybean oil in a solvent having relatively low eluting power and passage of the solution through a column containing an adsorbent, such as "Special Filtrol" (a fuller's earth, silica gel, "Doucil" (a sodium aluminum silicate used as a water softener) aluminum, calcium and magnesium oxides. While we prefer to use solvents of low eluting power, more active solvents can be used, especially with the stronger adsorbents. Solvents with slight eluting activity include petroleum ether and carbon tetrachloride. Examples of solvents having higher eluting power are benzene, ether, methanol and acetone. After the tocopherol has been adsorbed on the adsorbent, the column is washed with the same or another solvent in order to elute the adsorbed tocopherol therefrom. Usually a stronger eluting solvent is used in this step.

The adsorption process described has the distinct advantage that it can be very economically carried out in conjunction with a process for solvent extracting the soybean oil from the soybeans. Thus, a hexane solution of soybean oil extract, as it is obtained in commercial extraction plants, can be directly passed through the adsorbent in the manner described. This would mean that a distillation operation to vaporize the hexane from the extracted oil prior to adsorption would be avoided. Adsorption also has the advantage that unsaturated glyceride constituents in the soybean oil are preferentially adsorbed and can be separated during the adsorption step, thus giving a secondary product having improved drying properties. The gamma tocopherol contained in soybean oil is much more readily adsorbed than alpha or beta tocopherol and, since gamma tocopherol is the main form which occurs in soybean oil, this procedure is very effective for the recovery of the tocopherol content of soybean oil.

The high vacuum, unobstructed path distillation operation is carried out in the conventional manner. Gravity flow or centrifugal force high vacuum unobstructed path stills may be used. The pressure is that which is conventionally used for such distillations, i. e., below 1 mm., and preferably below .1 mm., such as, for instance, .01 to .001 mm. The temperature is preferably between about 150° and 250° C. The tocopherol content of the soybean oil distills as a preliminary fraction and we prefer to separate a narrow cut, since distillation of a large amount of the oil requires extensive exposure to heat and destroys the tocopherol content. A cut of about 1% or less seems to be the optimum amount to be removed as a tocopherol fraction.

The solvent extraction can be accomplished by treating the soybean oil with a solvent which is substantially immiscible therewith at the temperature of extraction, followed by stratification to form a solvent layer and an oil layer, followed by removal of the solvent layer and vaporization of the solvent therefrom, preferably under vacuum to leave a tocopherol concentrate as a residue. Examples of suitable solvents are methyl and ethyl alcohol and furfural. If desired, the mixing of the solvent and oil can take place at an elevated temperature at which the two are more or less miscible, followed by cooling to stratify into two layers.

The concentrate prepared by any of the foregoing or other methods is then converted into alpha tocopherol. This conversion may be directly applied to the product as obtained from the concentration process or further purification steps may be applied thereto. The conversion is effected by introducing a methyl group into the five position of the gamma tocopherol. Gamma tocopherol may, for instance, be treated with an aqueous solution of formaldehyde in the presence of hydrogen chloride. This results in the introduction of a chloromethyl group into the five position. This group is then converted into the methyl group by a reduction procedure, such as by the Clemmensen procedure, catalytic hydrogen or zinc dust and hydrochloric acid. Other hydrogen halides than hydrogen chloride may be used and, instead of using formalin a polymer, such as paraformaldehyde may be used. Chloromethyl ether may also be substituted for formalin.

*Example 1.—Concentration of tocopherol by high vacuum unobstructed path distillation*

Two tankcars of crude soybean oil were degummed in known manner by agitating at about 85° C. with 2% water to remove phosphatides, the oil being separated from the phosphatides sludge and gum by centrifuging. After the refining operation the oil contained 0.185% tocopherol. This oil was passed through a degasser at about 150° C. at a pressure of about 1 mm. in order to remove moisture and absorbed gases and then was passed over a centrifugal vaporizing surface of a high vacuum unobstructed path still which was at a temperature of approximately 180° C. and pressure of approximately 3 to 15 microns. Two percent, by weight, of the soybean oil was removed as a distillate and analysis indicated that the potency of the distillate was 94 mgs. of tocopherol per gram. Repeating the distillation would effect a corresponding increase in potency.

*Example 2.— Separation of tocopherol from soybean oil by chromatographic adsorption*

The soybean oil investigated had a tocopherol content (substantially all gamma) of 0.18% (by Emmerie-Engel assay). A sample (3.0 g.) in petroleum ether (50 cc.) was adsorbed on "Doucil" (50 g.). The column was washed with petroleum ether (200 cc.), 50% petroleum ether-benzene (200 cc.), 10% benzene-ether (200 cc.), 50% benzene-ether (200 cc.) and ethyl ether (200 cc.). Each solvent was collected in a separate fraction, five in all being taken as shown in the table below. The tocopherol contents of the fractions are also given.

TABLE I

| | Oil Recovered | | Percent Tocopherol by E.-E. | Percent Tocopherol Recovered, E.-E. |
|---|---|---|---|---|
| | Grams | Percent | | |
| Original | | | .18 | |
| 1-105-1 | 1.0833 | 36.11 | None | |
| 1-105-2 | 1.3973 | 46.58 | None | |
| 1-105-3 | 0.1375 | 4.58 | 1.04 | 26.5 |
| 1-105-4 | 0.1927 | 6.42 | 1.41 | 50.5 |
| 1-105-5 | 0.0512 | 1.71 | 1.72 | 16.3 |

The original soybean oil in this example had an iodine value of 107.3. The iodine values of fractions 1, 2, 3 and 4 were, respectively, 116.2, 132.3, 133.4 and 222.

*Example 3.—Concentration of tocopherol in soybean oil by solvent extraction*

A 20 g. sample of crude soybean oil was agitated with 15 cc. of methyl alcohol for 3 to 4 minutes with an air stirrer. The mixture was allowed to settle for two minutes and the solution decanted. This operation was repeated for five extractions. The alcohol extracts were combined and, upon analysis, it was determined that 14% of the oil and 95% of the tocopherol in the oil were extracted. Removal of the solvent by vaporization under vacuum left an oil residue containing 1.18% tocopherol. The starting raw oil contained 0.19% tocopherol.

*Example 4.—Conversion of tocopherol concentrate from soybean oil to alpha tocopherol*

3.3 g. of a tocopherol concentrate prepared by molecular distillation of soybean oil (62% tocopherol by the Emmerie-Engel assay, 100% gamma tocopherol by chemical assay) was dissolved in 75 cc. of ether. Paraformaldehyde (0.4 g.) and zinc chloride (0.4 g.) was added and a vigorous stream of hydrogen chloride gas passed into the suspension for fifteen minutes at room temperature and the mixture allowed to stand overnight. The mixture was washed with water, dried and evaporated. The resulting oil assayed for 46% tocopherol and gave a positive chloride test after a sodium fusion. It was then reduced with zinc-mercury amalgam and concentrated hydrochloric acid in ethanol and then vacuum distilled under molecular conditions after separation from the reaction mixture. Two distillate fractions were obtained which contained 22.5% of the original tocopherol. A portion of the second distillate was treated with succinic anhydride and pyridine and 0.1 g. of alpha tocopherol acid succinate was isolated and identified.

Soybean oil is used to a large extent for industrial purposes, such as for paint. The tocopherol contained therein is, therefore, wasted and is, as a matter of fact, harmful for most of the industrial uses. Thus, the tocopherol slows up the drying action of the oil when used in paints. Furthermore, soybean oil is not a good source of tocopherol having vitamin E activity, since it contains mostly gamma tocopherol, which has very little vitamin E action. Our improved procedure results in the conversion of a material which was heretofore wasted into a material having at least 100 times the vitamin E potency of the waste product. Therefore, the invention greatly increases the amount of vitamin E active material available for medicinal purposes. If the soybean oil is destined for use as a food the converted alpha tocopherol can be added to the oil from which gamma tocopherol has been removed so that its vitamin E activity is increased.

What we claim is:

1. The process of preparing a vitamin E concentrate having high vitamin E potency, which process comprises separating the tocopherol contained in a soybean oil by directly passing a solution of soybean oil in an organic solvent which solution is obtained by extracting crushed soybean with the solvent into contact with an adsorbent, adsorbing the tocopherol content of the solvent solution, separating the tocopherol from the adsorbent and converting said separated tocopherol into alpha tocopherol.

2. The process of preparing a vitamin E concentrate having high vitamin E potency, which process comprises in combination separating the tocopherol contained in soybean oil by passing a solvent solution thereof into contact with an adsorbent preferentially adsorbing the tocopherol and unsaturated glyceride content of the soybean oil on the adsorbent and separating the adsorbed tocopherol and unsaturated glycerides in concentrated form and converting said separated tocopherol into alpha tocopherol.

3. The method of preparing a product having high vitamin E potency which comprises separating from soybean oil a concentrate containing tocopherol material in its naturally occurring form having relatively low vitamin E potency and increasing the vitamin E potency of said concentrate by converting a substantial part of said naturally occurring tocopherol material to the alpha tocopherol form.

4. The method of preparing a product having high vitamin E potency which comprises separating from soybean oil a concentrate containing tocopherol material in its naturally occurring form having relatively low vitamin E potency and increasing the vitamin E potency of said concentrate by halomethylating and reducing said halomethylated compound to alpha tocopherol.

5. The method of preparing a product having high vitamin E potency which comprises separating from soybean oil a concentrate containing tocopherol material in its naturally occurring form having relatively low vitamin E potency and increasing the vitamin E potency of said concentrate by chloromethylating and reducing said chloromethylated compound to alpha tocopherol.

6. The method of preparing a product having high vitamin E potency which comprises subjecting soybean oil to high-vacuum unobstructed-path distillation to effect separation of a tocopherol concentrate comprising not more than 2 percent of the original oil, said tocopherol concentrate being in its naturally occurring form in which it has relatively low vitamin E potency, and increasing the vitamin E potency of said concentrate by converting a substantial part of said tocopherol concentrate to the alpha tocopherol form.

7. The method of preparing a product having high vitamin E potency which comprises subjecting soybean oil to high-vacuum unobstructed-path distillation to effect separation of a tocopherol concentrate comprising not more than 2 percent of the original oil, said tocopherol concentrate being in its naturally occurring form in which it has relatively low vitamin E potency, and increasing the vitamin E potency of said concentrate by halomethylating and reducing the halomethylated product to alpha tocopherol.

8. The method of preparing a product having high vitamin E potency which comprises subjecting soybean oil to high-vacuum unobstructed-path distillation to effect separation of a tocopherol concentrate comprising not more than 2 percent of the original oil, said tocopherol concentrate being in its naturally occurring form in which it has relatively low vitamin E potency, and increasing the vitamin E potency of said concentrate by chloromethylating and reducing the chloromethylated product to alpha tocopherol.

9. The method of preparing a product having high vitamin E potency which comprises providing a concentrate of naturally-occurring tocopherol material separated from soybean oil and having relatively low vitamin E potency, and increasing the vitamin E potency of said concentrate by converting a substantial part of said naturally-occurring tocopherol material to the alpha-tocopherol form.

KENNETH C. D. HICKMAN.
LEONARD WEISLER.

REFERENCES CITED

The following references are of record in the file of this patent:

UNITED STATES PATENTS

| Number | Name | Date |
|---|---|---|
| 2,321,928 | McFarlane et al. | June 15, 1943 |
| 2,327,766 | Cawley | Aug. 24, 1943 |
| 2,379,420 | Baxter et al. | July 3, 1945 |

OTHER REFERENCES

Smith, Chemical Reviews, vol. 27, No. 2, October 1940 page 317.

Quackenbosh et al., Ind. & Eng. Chem., Oct. 1941, pages 1276–1278.

"Organic Reactions," vol. I, by Adams et al., Wiley & Sons, 1942, pages 63–91.